(12) United States Patent
Stein

(10) Patent No.: US 9,761,069 B2
(45) Date of Patent: Sep. 12, 2017

(54) TOUCH CAPABLE RFID INVENTION

(71) Applicant: A1 LOCK DOCS LTD., Dublin (IE)

(72) Inventor: John William Stein, Allentown, PA (US)

( * ) Notice: Subject to any disclaimer, the term of this patent is extended or adjusted under 35 U.S.C. 154(b) by 0 days.

(21) Appl. No.: 13/261,957

(22) PCT Filed: Mar. 25, 2013

(86) PCT No.: PCT/US2013/000093
§ 371 (c)(1),
(2) Date: Sep. 23, 2014

(87) PCT Pub. No.: WO2013/147963
PCT Pub. Date: Oct. 3, 2013

(65) Prior Publication Data
US 2015/0048925 A1    Feb. 19, 2015

Related U.S. Application Data

(60) Provisional application No. 61/685,750, filed on Mar. 24, 2012.

(51) Int. Cl.
*H04B 5/00* (2006.01)
*G07C 9/00* (2006.01)

(52) U.S. Cl.
CPC ........ *G07C 9/00111* (2013.01); *H04B 5/0012* (2013.01); *H04B 5/0062* (2013.01)

(58) Field of Classification Search
CPC ............................. H04B 5/0062; H04B 5/0012
USPC ......................................... 340/5.61; 455/41.1
See application file for complete search history.

(56) References Cited

U.S. PATENT DOCUMENTS

| | | | |
|---|---|---|---|
| 7,890,055 B1 * | 2/2011 | Stein .................... | H04B 5/0012 340/573.1 |
| 7,994,920 B2 * | 8/2011 | Hatfield | |
| 2009/0309699 A1 * | 12/2009 | Pollabauer | |

FOREIGN PATENT DOCUMENTS

JP          2005027095          *  1/2005

OTHER PUBLICATIONS

Quantum Research Group, Kirchoff Current Law, Q Prox p.3.*

* cited by examiner

*Primary Examiner* — Albert Wong
(74) *Attorney, Agent, or Firm* — Richard A. Castellano; DNL ZITO

(57) ABSTRACT

A hybrid security access device is described herein that combines Radio Frequency Identification RFID technology with a new Touch Access technology that utilizes the body for near field emitter communications. Combining these technologies results in security access tags that can remain in or about a person such as in a wallet, briefcase, purse, etc. and be activated by just touching a touch access equipped RFID reader. The need to extract and hand present an access tag close to a reader as required by RFID technology is eliminated. Efficiency, security compliance, card loss due to handling and convenience is the result of the combination of these two technologies and is the basis of this patent application.

5 Claims, 6 Drawing Sheets

PRIOR ART

Typical RFID Access Scheme

PRIOR ART

PRIOR ART

TOUCH CAPABLE RFID INVENTION

This claims the benefit of a prior filed provisional patent application No. 61/685,750 filed on Mar. 24, 2012.

FIELD OF INVENTION

This application relates to radio-frequency identification (RFID) technology and improvements to that technology using principles described in U.S. Pat. No. 7,890,055.

BACKGROUND

There are two classes of touch systems today. Non-discriminatory touch systems are those systems that permit access to anybody and discriminatory touch systems that permit access only to specific persons. This patent application involves discriminatory touch access systems as per U.S. Pat. No. 7,890,055.

It is well known that Radio Frequency Identification RFID Chips, some the size of a grain of rice (FIG. 6) or embedded in cards, are dependent upon being brought within ~21 cm of a companion RFID reader to work. This technology is central to personal identification for credit cards, door entrances, etc. in the security industry. To gain security permission using this technology requires that a card or tag like device embedded by these RFID chips be presented, usually by hand, proximal to a companion RFID reader. In operation, the RFID reader periodically sends a radio signal strong enough to activate the RFID chip embedded in a card or tag which stores up enough energy from the RFID reader radio signal to power and return a secure coded radio signal from the card or tag like device to the RFID reader. This secure coded radio signal when received by the RFID reader then in turn gives electronic permission to operate entrance doors, point of sale terminals, etc. FIG. 1 shows a typical presentation of a RFID card to a RFID reader for one seeking entrance to a secure area. FIG. 2 is a functional diagram of a typical RFID system. Shown is a RFID Access Tag within the required ~21 cm. distance of a RFID reader. The Access Tag pickup coil (PC) detects a rf signal from the reader which is decoded by the RFID chip. The RFID chip electronics decodes the data from the reader and if access permissions are correct sends a radio command to the RFID read circuitry to allow the RFID read circuitry output to open a door, remove a barrier, permit a transaction, etc.

BRIEF DESCRIPTION OF THE DRAWINGS

The invention will now be described by way of example with reference to the accompanying figures of which.

DETAILED DESCRIPTION OF THE EMBODIMENT

Figure 1:
FIG. 1 shows a person presenting a typical RFID access card to a reader to gain access to a secure area usually through a portal such as a doorway.
Figure 2:
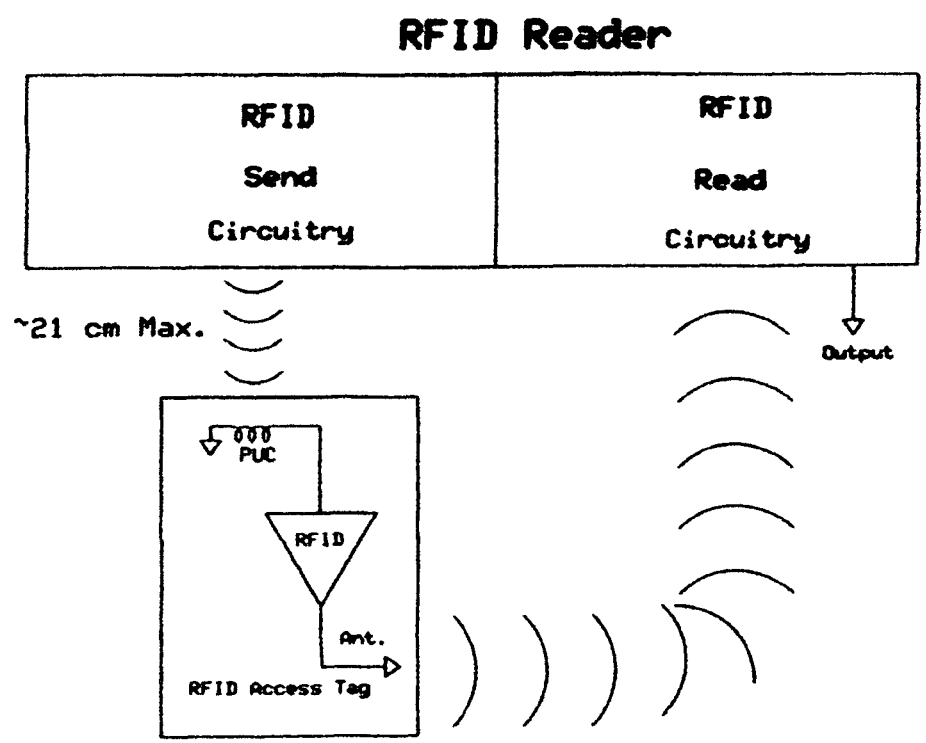
FIG. 2 describes the functional blocks of a typical RFID system.
Figure 3:
FIG. 3 shows a person gaining access to a secure area using touch only. The access card in this instance is located out of sight secure somewhere on or about a person in possibly a wallet or brief case, This is all made possible by the herein described patent application.
Figure 4:
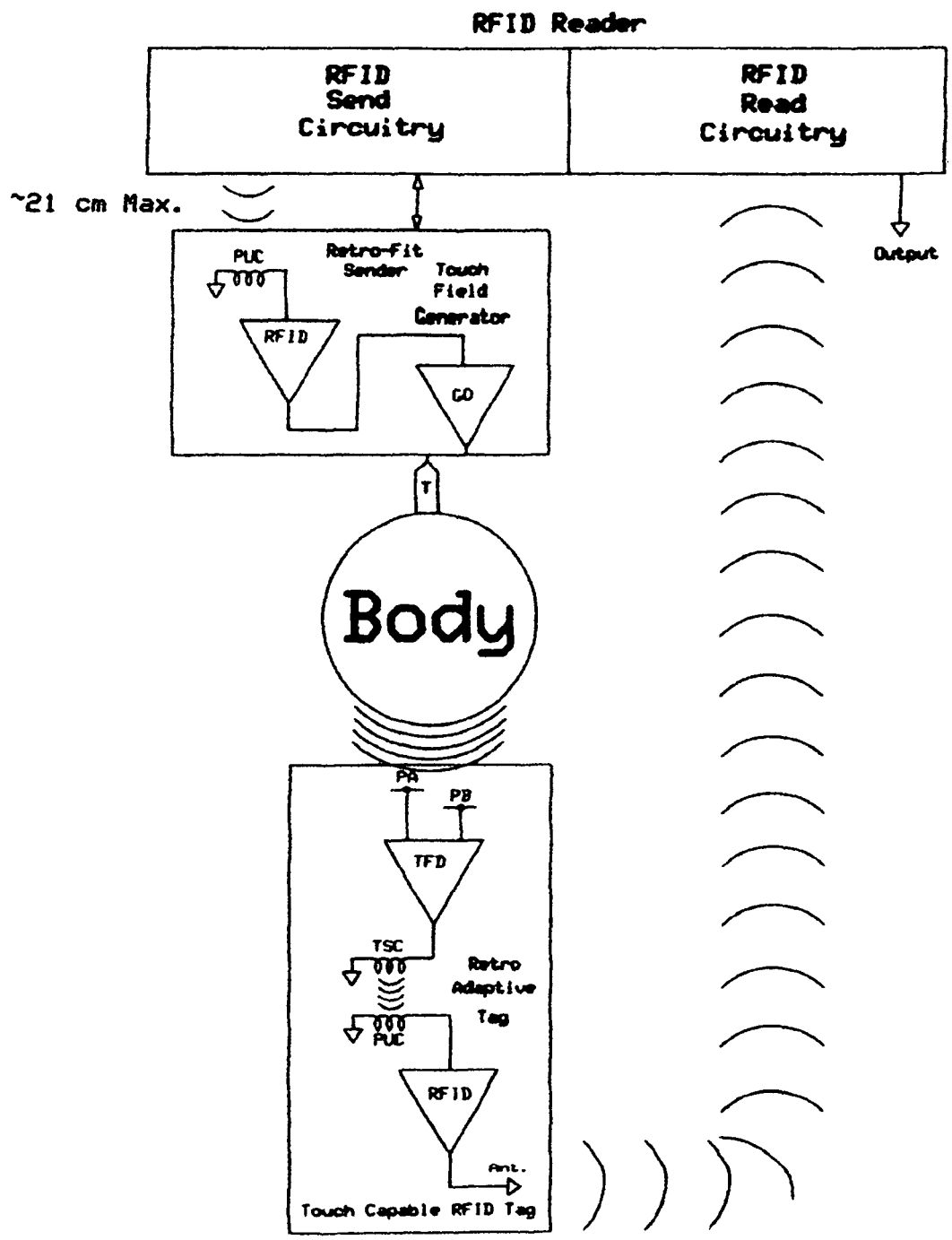
FIG. 4 describes the functional blocks of the herein described patent application as a retrofit sender to an existing RFID reader and a touch capable RFID tags using existing off the shelf RFID electronic components.
Figure 6:
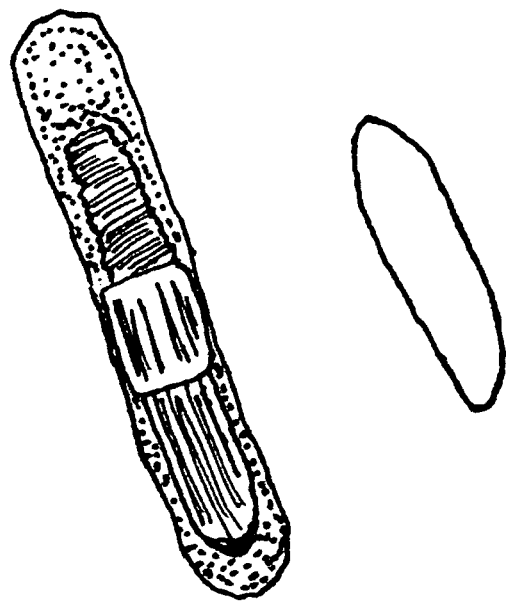
FIG. 6 describes a miniature off the shelf RFID component that is typically used to tag to identify animals. An operational an example follows of this RFID component that if placed close to the Touch Sense Coil (TSC) in FIG. 4 would, without modification, send an RFID radio signal to the originating RFID sender/reader if an authenticated touch signal was initiated.

FIG. 4 consists of four distinct components. The RFID Reader, Retrofit Sender, the Body and the Touch Capable RFID Tag. The RFID reader has three subcomponents, the send circuitry, read circuitry and output. The Retro-Fit Sender has two sub components, RFID circuitry and the Touch Field Generator. The Body is one component. Touch Capable RFID Tag has two sub components, Touch Field Detector (TFD) circuitry and an off the shelf RFID system as shown in FIG. 6.

In this detailed description, the RFID Reader and Retrofit Sender are within 21 cm. of each other rf wise but not connected. The Touch Field Generator gated output (GO) is electrically connected to the Retrofit Sender housing and the RFID Reader housing both of which form a touch access surface. Bodily contact (T) with this touch access surface imparts a field over the entire surface of the body (see patent U.S. Pat. No. 7,890,055) representative of the RFID signal being sent by the RFID Reader Send Circuitry to the Retrofit Sender. If a Touch Capable RFID tag is located on or about the body then the RFID data presented by the RFID Reader to the Retro-Fit Sender will be transmitted by the Touch Capable RFID tag to the RFID Reader Read circuitry. If security permissions are correct, the RFID Reader read circuitry will output a signal to operate release mechanisms such as doors.

The mechanism by which the above takes place is the Touch Field Detector (TFD) system described by patent # U.S. Pat. No. 7,890,055 placed in tight if inductive coupling with a RFID component or like component as shown in FIG. 6. This coupling scheme is the essence of the patent application herein. By this process, access cards, tags etc. will enjoy a much higher level of security and increased efficiency through less handling while at the same time enhance security compliance because of convenience.

Figure 5:
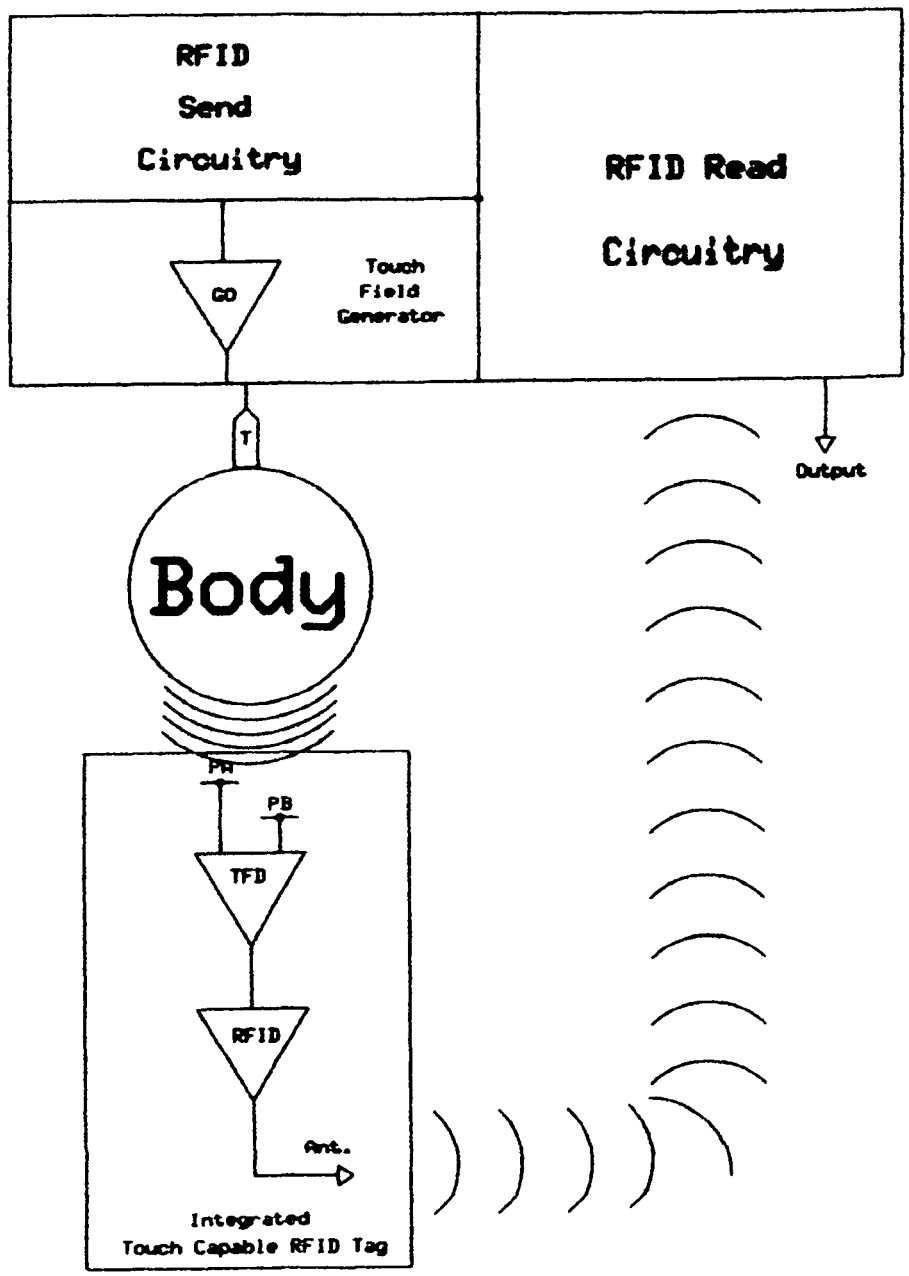
FIG. 5 describes the functional blocks of the herein described patent application as an integrated touch capable RFID reader and an integrated touch capable RFID tag. This would be typical of new RFID systems offerings.

FIG. 5 operates as does the system described in FIG. 4 except the components are integrated in design and manufacturer to save cost as would be expected in newly marketed products.

I claim:

1. A system useful for security and access control, comprising:
    a Radio Frequency Identification (RFID) reader comprising a read circuitry, an output circuitry, and a send circuitry, and configured to produce and output an RFID signal containing RFID reader data;
    a sender comprising a sender housing, RFID circuitry configured to receive the RFID signal, and a touch field generator comprising a low output impedance gated voltage oscillator electronically connected to the sender housing, the touch field generator configured to convert the RFID signal received by the RFID circuitry to an electro field signal and generate the electro field signal representative of the RFID signal containing the RFID reader data; and a touch access surface formed by the sender housing and connected to the low output impedance gated oscillator, the touch access surface modulating the electro field signal over a higher impedance surface of a human or non-human animal body that contacts the touch access surface.

2. The system of claim 1, wherein the RFID circuitry of the sender is located within 21 centimeters of the send circuitry of the RFID reader.

3. The system of claim 1, comprising:

a touch capable RFID tag disposed on or about the human or non-human animal body, the touch capable RFID tag comprising an RFID component coupled to a touch field detector component, the touch field detector component comprising an amplifier configured to detect the modulated electro field, the touch field detector component and the RFID component configured to convert the electro field to an RFID signal readable by the RFID component for generating an RFID return signal and outputting the RFID return signal to the read circuitry.

4. The system of claim 3, the RFID component of the touch capable RFID tag located at a distance of greater than 21 centimeters from the send circuitry of the RFID reader.

5. The system of claim 1, the RFID circuitry of the sender disposed within the RFID reader.

\* \* \* \* \*